United States Patent [19]

McGinley et al.

[11] 4,385,987

[45] May 31, 1983

[54] WATER TREATMENT APPARATUS

[75] Inventors: Charles M. McGinley, Stillwater; Arlen R. Schamber, Minneapolis; Denny L. Melin, Anoka; Ronald L. Christensen, Maple Grove, all of Minn.; Edward K. Tazzia, East Detroit, Mich.; Richard W. Hackbarth, Roseville, Minn.; Terry M. Fogarty, Lakeland, Minn.; Richard C. Faint, Bloomington, Minn.

[73] Assignee: Geo. A. Hormel & Company, Austin, Minn.

[21] Appl. No.: 207,870

[22] Filed: Nov. 18, 1980

Related U.S. Application Data

[63] Continuation of Ser. No. 74,347, Sep. 11, 1979, abandoned.

[51] Int. Cl.³ .............................................. C02F 3/18
[52] U.S. Cl. ...................................... 210/150; 261/92
[58] Field of Search .................... 261/92, 93; 210/150, 210/151, 619

[56] References Cited

U.S. PATENT DOCUMENTS 3,904,525 9/1975 Rosenberg ........................... 210/150
4,149,972 4/1979 Iwai et al. ........................... 210/150

Primary Examiner—Benoit Castel
Attorney, Agent, or Firm—Williamson, Bains, Moore & Hansen

[57] ABSTRACT

An apparatus for treating waste water includes a revolvable disc assembly partially submerged in a tank containing waste water. The disc assembly includes a plurality of similar lightweight nonmetallic discs, each disc comprising a plurality of similar disc sections. Adjacent discs of the disc assembly engage each other and each disc has a surface configuration that cooperates with the surface configuration of the next adjacent disc to define a plurality of concentric passages between the discs. A plurality of elongate rigid rods secure the disc through yieldable joints to a pair of circular end support members and to circular intermediate support members.

11 Claims, 11 Drawing Figures

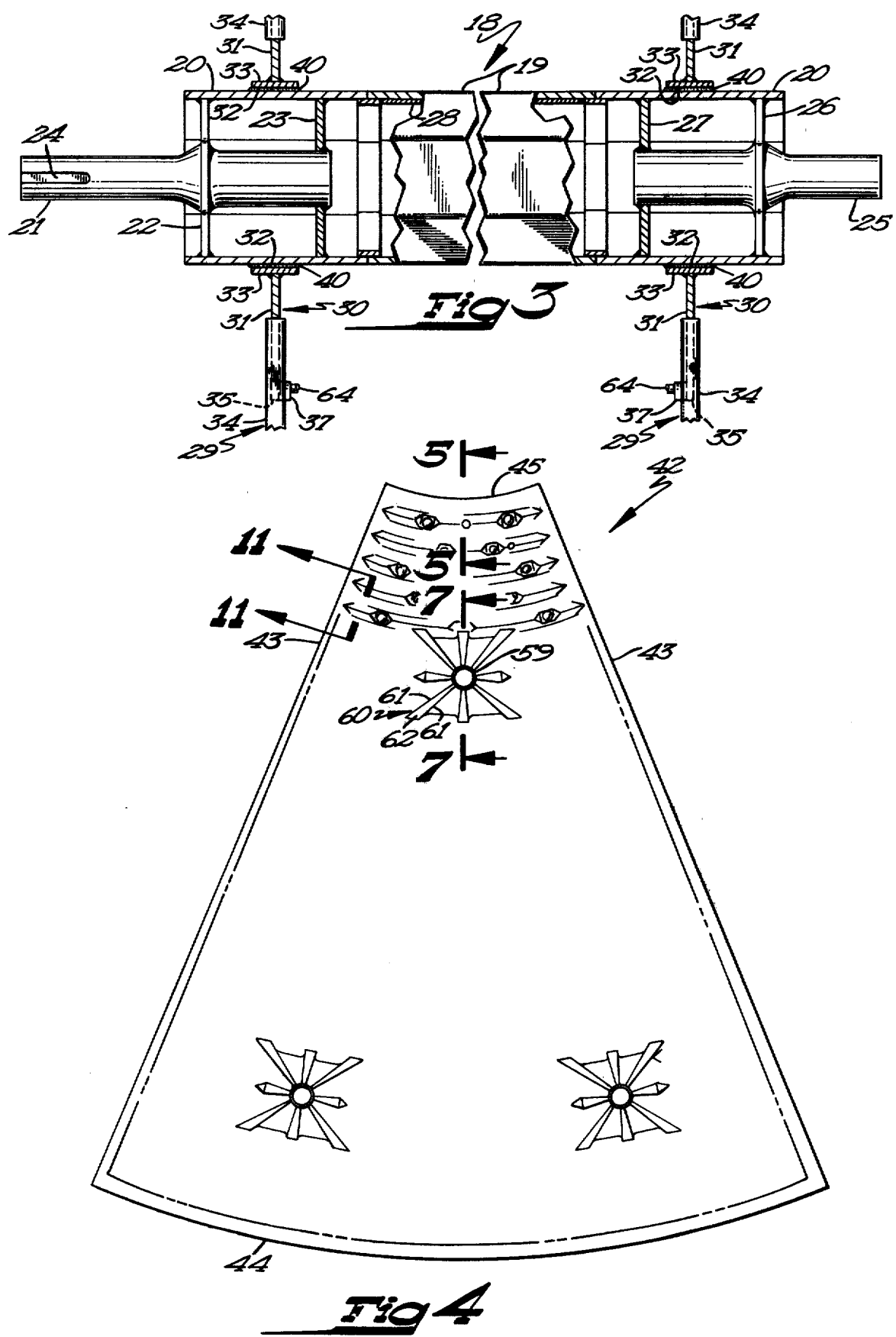

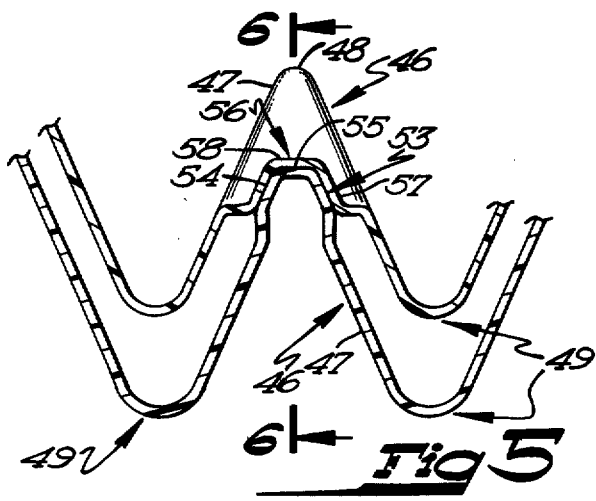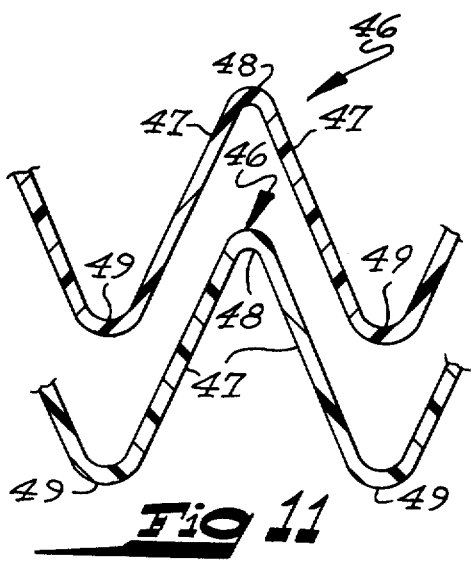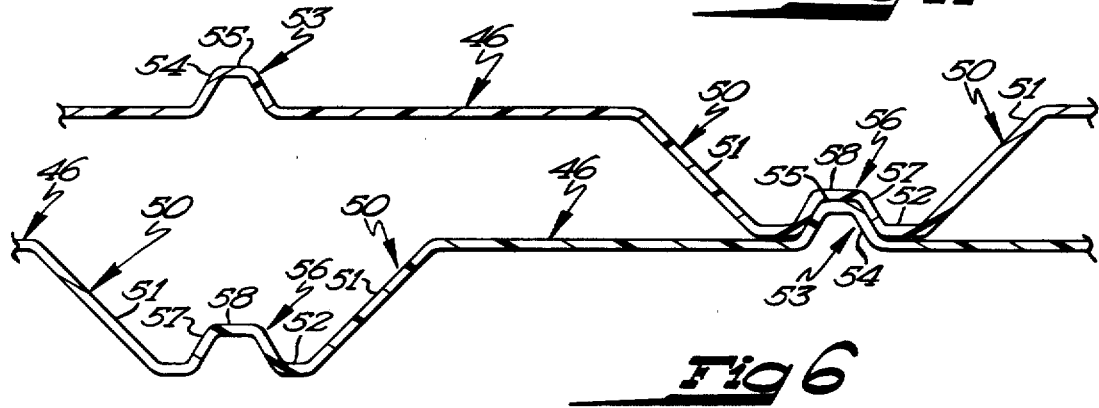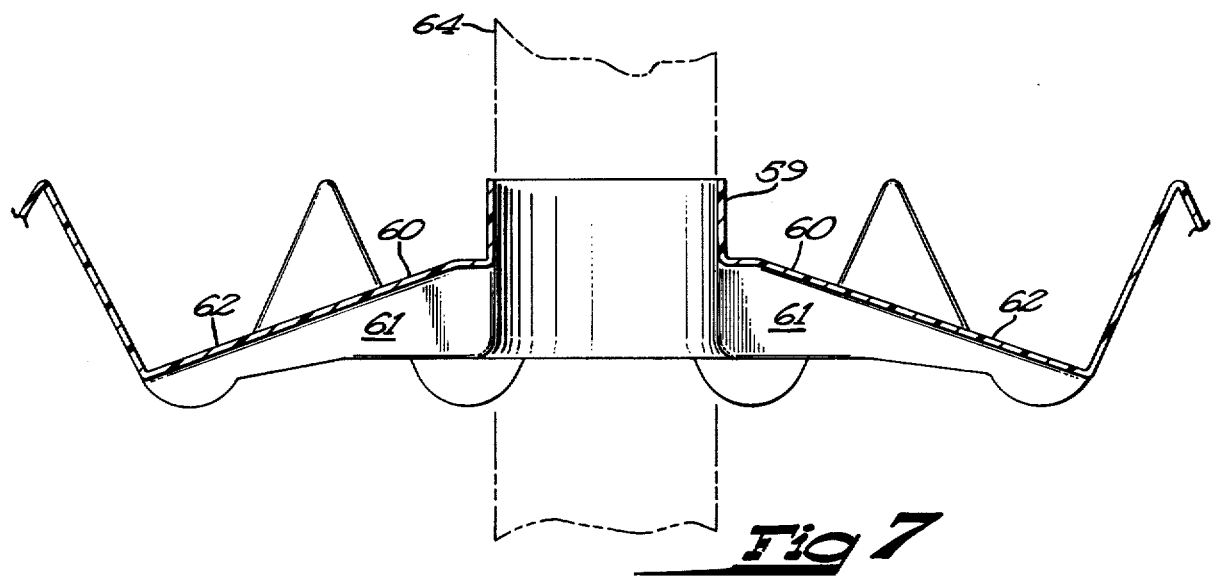

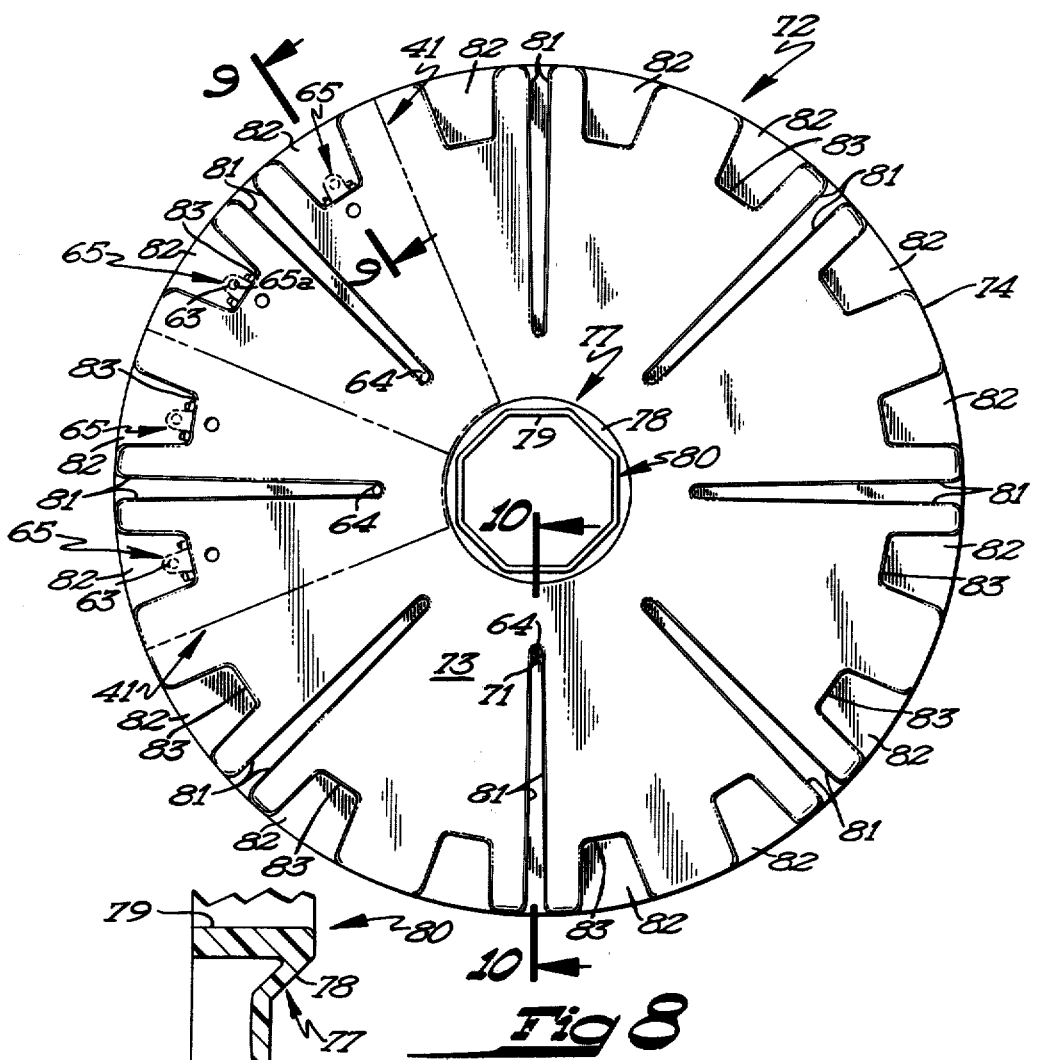
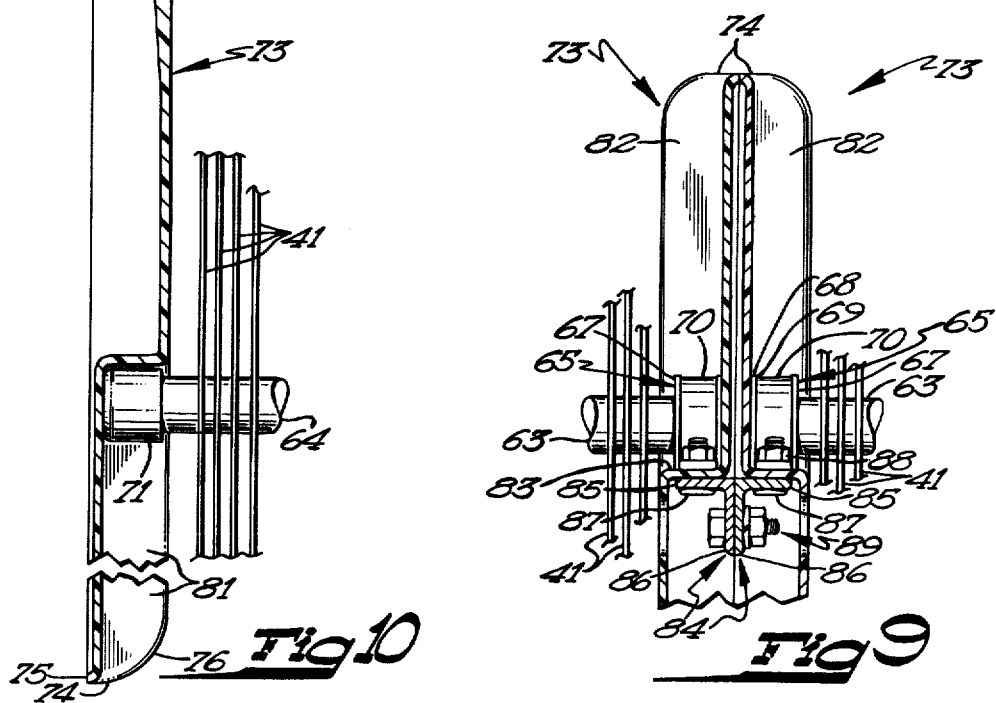

4,385,987

WATER TREATMENT APPARATUS

This is a continuation of application Ser. No. 74,347, filed Sept. 11, 1979, now abandoned.

SUMMARY OF THE INVENTION

This invention relates to a rotating disc apparatus for treating waste water.

Presently, there are a number of commercial rotating disc systems used in the waste water treatment field. The disc used in these commercial systems are usually formed of plastic and are assembled on a shaft so that adjacent discs engage each other. The disc assembly, which is partially submerged in waste water, is slowly rotated at a predetermined speed and the nutrient material is digested by the organisms growing on the surface of the disc. Therefore, the efficiency of the system is increased as the overall surface area of disc system is increased.

However, the size of the disc assembly is generally limited by the size of the tank in which the waste water is contained. In certain prior art devices, the overall surface of the assembly has been increased by increasing the number of discs in the assembly. Others have increased the surface of the disc assembly by providing each disc with a nonplanar surface configuration. However, by increasing the number of discs per assembly or by shaping each disc to have a nonplanar surface configuration in these prior art devices has resulted in increased power consumption required to rotate the disc assembly. Further, in some of these prior art systems, a paddle wheel effect is produced during rotation of the disc assembly which increased the power consumption.

It is therefore an object of this invention to provide a novel revolvable disc assembly for use in treating biological waste water including a plurality of lightweight nonmetallic discs disposed in an engaging relation with each other on a revolvable shaft and wherein the discs are constructed to increase the functional area thereof but are streamlined to minimize water resistance during rotation of the assembly.

Another object of this invention is to provide a novel biological disc assembly in which the disc has a unique surface configuration so that adjacent contacting discs define a plurality of interconnected concentric channels therebetween which effectively lowers the power consumption needed to rotate the assembly.

A further object of this invention is to provide a biological disc assembly for treating waste water which is arranged and constructed to eliminate harmful detrimental loads on the lightweight disc but permitting ready replacement of a disc in the field with a minimum of effort.

These and other objects and advantages of this invention will more fully appear from the following description made in connection with the accompanying drawings, wherein like reference characters refer to the same or similar parts throughout the several views.

FIGURES OF THE DRAWINGS

FIG. 3 is a side elevational view of the shaft of the assembly with parts broken away for clarity;

FIG. 4 is an elevational view of a disc segment;arrows;

FIG. 6 is a cross-sectional view taken approximately along line 6—6 of FIG. 5 and looking in the direction of the arrows;

FIG. 7 is a cross-sectional view taken approximately along line 7—7 of FIG. 4 and looking in the direction of the arrows;

FIG. 8 is an elevational view of a modified form of a support member;

FIG. 9 is a cross-sectional view taken approximately along line 9—9 of FIG. 8 and looking in the direction of the arrows; and FIG. 10 is a cross-sectional view taken approximately along line 10—10 of FIG. 8 and looking in the direction of the arrows.

FIG. 11 is a cross-sectional view taken approximately along line 11—11 of FIG. 4 and looking in the direction of the arrows.

DESCRIPTION OF THE PREFERRED EMBODIMENT OF THE INVENTION

Figure 1:
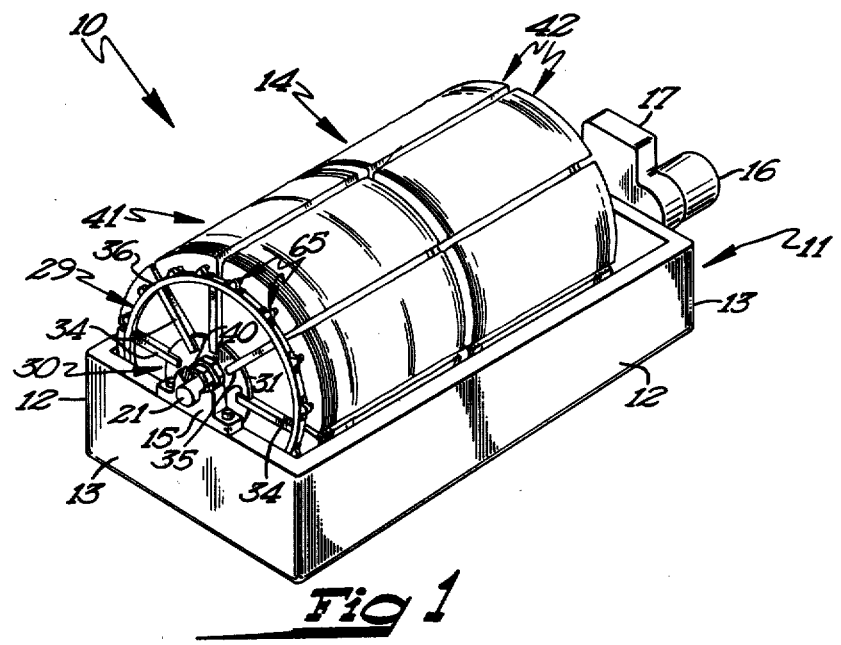
FIG. 1 is a front perspective view of the novel disc assembly disposed in a conventional waste water tank.

Referring now to the drawings and more particularly to FIG. 1, it will be seen that a biological treatment apparatus, designated generally by the reference numeral 10 is thereshown. The biological treatment apparatus 10 includes a generally rectangular shaped tank or container 11 having spaced apart parallel and sometimes sloping sidewalls 12, end walls 13 and a bottom wall (not shown), the tank is generally covered to protect the interior thereof from the elements. The tank 11 contains waste water flowing through and the biological disc assembly designated generally by the reference numeral 14, is mounted on the tank so that the assembly is partially submerged in the waste water. Suitable pillow bearings 15 are mounted on the upper edges of the end walls 13 and accommodate the ends of the shaft of the disc assembly 14 in a well known manner. An electric motor 16 and gear box 17 are provided for supplying power to rotate the disc assembly and its output shaft is connected to the shaft of the biological disc assembly 14.

Generally speaking, during operation of the biological disc assembly 14, the motor 16 will be energized and will rotate the disc assembly slowly through the gear box drive 17. Organisms growing on the surface of the various discs of the disc assembly digest the nutrient material as the water is passed over the surface of the disc during rotation of the assembly.

Figure 2:
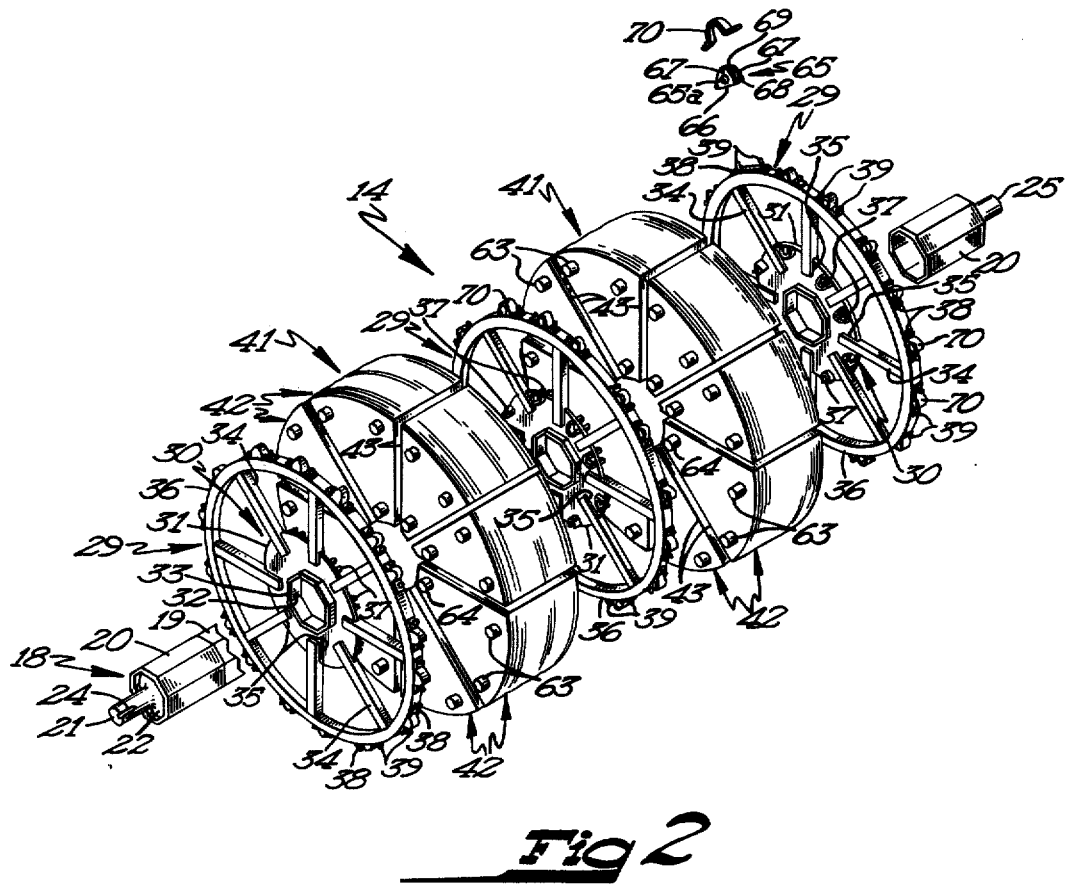
FIG. 2 is an exploded perspective view of the assembly illustrating details thereof.

Referring now to FIGS. 2 and 3, it will be seen that the biological disc assembly 14 includes an elongate tubular shaft 18 which is octagonal in cross-sectional configuration. The shaft 18 includes an elongate central section 19 to which is secured the end sections 20 at opposite ends thereof. It will be noted that the end sections 20 are butt welded to the central sections and project longitudinally therefrom. One of the end sections 20 carries an elongate drive stub shaft 21 which is affixed thereto and which projects axially therefrom. The drive stub shaft 21 is provided with an octagonal flange 22 which projects radially therefrom and which is secured to the inner surface of the associated end section 20 by welding. The inner end of the drive stub shaft 21 projects through an opening in an inner support plate 23 in the outer end of the drive shaft 21 and has an elongate longitudinally extending slot 24 therein for coupling with the output drive element gear reduction box 17.

The other end section 20 is provided with an elongate trunnion or idler shaft 25 which projects axially therefrom and which is provided with an octagonal flange 26 extending radially from the shaft. The inner end of the shaft 25 projects through an inner support plate 27 in the manner of shaft 21. The shafts 21 and 25 are positioned in the pillow bearings 15 and the drive stub shaft 21 extends through the associated pillow bearings for coupling with the output drive element of the gear reduction box 17.

Referring again to FIG. 3, it will be noted that the central section 19 is comprised of two elongate similar shaft sections 19 each including four of the sides of the octagon which are welded along contacting longitudinal edges by suitable welds. Similarly, the end sections 20 are also comprised of similar shaft sections 20 similar configurations to the shaft sections 19 but of shorter length which are also welded along their contacting surfaces. In the embodiment shown, the longitudinal weld lines along the shaft sections 19 of the central section 19 are provided with back-up welding strips 28.

Referring again to FIG. 2, it will be seen that the biological disc assembly 14 also includes a plurality of generally circular support members which are secured to the shaft 18 for rotation therewith. In the embodiment shown, a pair of end support members and only one intermediate support member is shown but it is pointed out that additional support members may be provided depending on the size of the disc assembly. Each circular support member 29 includes a central hub member 30 comprised of a circular flat hub plate 31 having a plurality of slots 35 therein and an octagonal opening 32 therethrough. The hub member 30 also includes an axially extending octagonal flange 33 which is secured to the inner edges defined by the octagonal opening 32 in the hub plate 31. Each support member 29 is also provided with a plurality of elongate bars 34 each projecting into the slots of the hub plate 31. The bars 34 which are secured in the slots 35 of the hub plate extend radially outwardly from the hub plate 31 and are secured at their respective outer ends to an annular ring member 36 as by welding.

It will be noted that each support member 29 is also provided with a plurality of U-shaped saddle elements 37, each attached to hub plate 31. It will be noted that each saddle element 37 is located equidistant between a pair of bars 34 and each saddle element has the ends thereof disposed substantially coextensively with the periphery of the hub plate 31.

The annular ring member 36 of each support member is provided with a plurality of substantially flat attachment plates 38 which are secured to the outer circumferential surface thereof. It will be note that the plates 38 are equally spaced throughout the entire circumferential surface of the ring member and in the embodiment shown, sixteen such plates are provided. Each attachment plate 38 on the end support members is provided with a pair of bolts 39 which project outwardly therefrom. However, each attachment plate on the intermediate circular support member has four bolts secured thereto and projecting outwardly therefrom.

Each support member 29 is mounted on the shaft 18 by means of thermosetting plastic such as urethane 40 or other suitable cementitious material so that the support members are firmly secured thereto. In this regard, it will be noted that the opening 32 in the hub member 30 of each support member is slightly larger than the cross-sectional size of the shaft 18. The thermosetting plastic 40 is interposed between the octagonal flange 33 and the adjacent external area of the shaft 18 and when the thermosetting plastic cures the support member 29 is securely affixed to the shaft. It is pointed out that each disc assembly will include two end support members and at least one intermediate support member.

Referring again to FIG. 2, it will be seen that each disc assembly includes a plurality of similar discs 41 positioned around the shaft 18 and arranged in groups positioned between a pair of the support members 29. It will be noted that each of the discs 41 is comprised of a plurality of disc sections 42 each being formed of a suitable lightweight plastic material, preferably polyethylene. Each of the disc sections 42 is formed in a molding process and carbon black is added to the polyethylene so that each disc section is pigmented deeply black which serves as an utraviolet stabilizer and thereby extends the service life of the polyethylene.

Referring now to FIGS. 4 through 7, it will be seen that each disc section 42 is of generally trapezoidal configuration each having longitudinal or radial edges 43 which converge inwardly from an arcuate outer edge 44 to a smaller inner arcuate edge 45.

Each disc section 42 includes a plurality of radially spaced apart concentrically arranged arcuate ribs 46 which project axially from the general plane of the disc section in one direction. It will be noted that these arcuate ribs 46 extend from adjacent one longitudinal edge 43 of the disc section to a point adjacent the other longitudinal edge thereof. The ribs are also concentrically arranged closely adjacent to the outer arcuate edge 44 to closely adjacent the inner arcuate edge thereof. The ribs 46 are of generally V-shaped cross-sectional configuration each including rib sides 47 that diverge from an apex 48.

Each of the disc sections 42 also includes a plurality of arcuate concentrically arranged channels 49 that extend from closely adjacent one longitudinal edge 43 of each disc section to a point located closely adjacent the other longitudinal edge thereof. It will be noted that the arcuate channels 49 are arranged concentrically adjacent the outer arcuate edge disc section to a point located closely adjacent the inner longitudinal edge thereof. It will further be noted that the channels 49 project axially from the general plane of the disc section in a direction opposite to that of the ribs 46 and are located between adjacent such ribs. In this regard, the sides 47 of the ribs continue to converge downwardly to define the lower arcuate portion of the channel 49.

Each of the arcuate ribs is provided with a plurality of transverse channels 50 therein which communicate adjacent arcuate channels 49 in a manner to be described more fully hereinbelow.

It will be noted that each transverse channel is formed by a pair of converging, sloping surfaces 51 which terminate in a flat, lower surface 52 spaced slightly above the general plane of the disc sections 42.

Referring again to FIG. 4, it will be noted that the innermost rib 46 may have only two or possibly one transverse channel 50 therethrough. However, it will be noted that the number of channels per rib increases from the innermost rib to the outermost rib. It will further be noted that the location of the transverse channels in one rib are staggered with respect to the location of the transverse channels 50 in the next adjacent rib. Thus, the transverse channels in adjacent ribs are not disposed in aligned relationship.

It will also be noted that each of the ribs 46 are provided with a plurality of spacer elements 53 which are of frustro-conical configuration. It will be noted as best seen in FIG. 6 that each of the spacer elements 53 has a somewhat continuous conical wall 54 which projects upwardly from the associated rib 46 and terminates in a flat surface 55.

It will further be noted that each transverse channel 50 has a frustro-conical spacer engaging element 56 projecting upwardly from the lower wall 52 thereof as best seen in FIG. 6. The spacer engaging element 56 includes a continuous conical wall 57 which terminates in an upper flat surface 58. It will be seen that the height dimension of each spacer engaging element 56 is substantially less than the height dimension of the ribs 46.

The spacer elements 53 on the ribs 47 are adapted to project through and engage the flat surface 58 of the spacer engaging element of the next adjacent disc section 42. It will therefore be seen that the engagement of the spacer elements with the space engaging elements constitutes the only contact between the disc section of one disc with the disc section of the next adjacent disc. The interengagement of the spacer elements on adjacent discs 41 provided stability to the entire assembly both radially and arcuately.

It is pointed out that since each spacer element 53 on one disc 41 engages a spacer engaging element 56 on the next adjacent disc, the location of the spacer elements and spacer engaging elements are reversed on adjacent discs 41. Thus alternate discs 41 in each group are identical in construction to each other.

Each disc section 42 is also provided with a plurality of spaced apart cylindrical bearing elements 59 which are integrally formed with the disc section and projects axially from one surface thereof. In the embodiment shown, three such bearing elements are provided for each disc section, two of which are circumferentially spaced apart but are located adjacent the outer arcuate edge of the associated disc section. The other bearing element for each disc section is spaced radially inwardly from the other bearing elements and is spaced adjacent but radially outwardly of the inner arcuate edge of the associated disc section. It will be noted that the innermost bearing element 59 for each disc section is spaced equidistant from the other two bearing elements of the disc element.

Each bearing element 59 also has a plurality of ribs 60 integral with the bearing element and radiating outwardly therefrom. It will be seen that each rib 60 includes a pair of flat sides 61 converging to a flat surface 62 which slopes outwardly from the associated bearing element. The ribs coact with the associated bearing element to impart rigidity thereto and also reinforce that portion of the disc section immediately adjacent the bearing element.

Means are provided for mounting and supporting the disc on the circular support members 29 and this means includes a plurality of similar elongate plastic outer support rods 63 and a plurality of elongate inner support rods 64 similar to the outer support rods 63. The outer support rods 63 project through the outer pair of bearing elements 59 in each disc section while the inner support rods 64 project through the innermost bearing element in each disc section. Each end of each outer support rod 63 has a flexible coupling member 65 secured thereto. Each coupling member 65 is formed of a suitable yieldable material, preferably rubber or the like, and includes a substantially flat lower surface 66, flat end surfaces 67 and an arcuate intermediate surface 68 that extends between the end surfaces and upwardly from the flat lower surface. The intermediate surface 68 has an arcuate groove 69 therein.

Means are provided for securing these coupling members 65 for each outer support rods 63 to the support members 29 and this means includes a generally U-shaped attachment element 70 having outturned end portions which are provided with apertures therein for receiving the bolts 39 therethrough for each attachplate 38. It will be seen that a U-shaped attachment element 70 is positioned in the groove 69 of each coupling member and nuts secure the attachment element 70 to the bolts. It will therefore be seen that each disc section 42 has a pair of the outer support rods 63 projecting therethrough and connected to the outer circumference of the circular support members 29. Therefore each complete disc 41 has sixteen such outer support rods secured thereto.

Each inner support rod 64 has a generally cup-shaped, somewhat flexible coupling element 71 secured to each end thereof and each coupling element 71 is also formed of a yieldable material such as rubber or the like. Each of the coupling elements 71 is urged into a U-shaped saddle element 73 to releasably but firmly secure the end of each inner support rod 64 to a support member.

In the embodiment shown, a group of disc members and their associated inner and outer support rods extend between one of the circular end support members 29 and an intermediate support member. Therefore, the intermediate support member 29 has the support rods from two groups of discs secured thereto. The torsional loads on each disc produced by gravity and drag (through the water) is transferred through the circular support rods and the flexible coupling elements to the support members. The use of the circular support members with the outer support rods as well as inner support rods provides external support for the disc as well as an internal support. It will therefore be seen that with this arrangement, the entire disc assembly while being of relatively lightweight construction is extremely strong. It is also pointed out that the location of the points of support by the support rods also tends to minimize the magnitude of any torque load exerted on the disc and disc sections.

Referring now to FIGS. 8 through 10, it will be seen that a different embodiment of the circular support member, designated generally by the reference numeral 72, is thereshown. In this regard, it will be seen that each circular support member is comprised of a pair of substantially identical circular support discs 73 which are secured together, each being formed of a suitable plastic. Each circular support disc 73 is of substantially flat configuration and has a circumferential flange 74 that extends axially therefrom and terminates in a substantially flat circumferential edge 75. It will be noted that each support disc 73 merges into the circumferential flange 74 by an arcuate surface 76 defined by a radius of predetermined magnitude.

Each circular support disc 73 also includes a central hub 77 including a generally conical portion 78 having an octagonal opening 79 therethrough. The central hub 77 also includes an axially extending flange 80 which is of octagonal configuration, as best seen in FIG. 8. It is pointed out that the opening 79 will be slightly larger than the cross-sectional configuration of the shaft 18.

Each circular support disc 73 has a plurality of elongate molded-in radially extending channels 81 therein which extend from the circumference of the support disc radially inwardly to a point adjacent the central hub 77. It will be noted that the channels 81 taper inwardly and that eight such tapered channels are provided and are symmetrically arranged. Each support disc 73 also has a plurality of molded-in recesses 82 therein which extend from the circumference of the support disc inwardly a short distance. In this regard, it will be noted that the recess 82 extends inwardly substantially less than half the radial extent of the tapered channels 81. Each recess 82 terminates in a substantially flat, axially extending wall surface 83, as best seen in FIG. 9. It will be noted that a pair of recesses 82 are located between adjacent tapered channels 81 and that each support disc has sixteen such recesses.

Referring again to FIG. 9, it will be seen that means are provided for securing each pair of support discs 73 together and for securing the outer support rods 63 to the support members. In this regard, a pair of angle brackets 84 is provided each bracket including a leg 85 having a pair of apertures therethrough and a leg 86 also having an aperture therethrough. The apertures in the leg 85 accommodate the bolts 87 which project through the openings in the U-shaped attachment element 70 for the purpose of securing each coupling member 65 in the recess 82. Suitable nuts 88 together with bolts 87 secure elements 70 in place.

The legs 86 of each pair of angle brackets 84 are disposed in abutting relation with the openings therein disposed in registering relation for accommodating the nut and bolt assembly 89 which secures the brackets together and also secures the disc together so that the circumferential edges 75 thereof abut each other. It will be noted that when the two support discs 72 are secured together to form the support member 73, the tapered channel 81 and recesses 82 face in opposite directions. Further, the octagonal flange 80 for each hub extends axially in opposite directions. Each tapered channel 81 receives and engages one of the coupling members 71 which is attached to an end of the inner support rod 64.

Thus, the support members 73 will be of lighter weight than the support members illustrated in FIG. 2 but have the structural strength at least comparable to the first-mentioned support members.

When the biological disc assembly is assembled, the circular support members 29 or 72 will be mounted on the shaft 18 by thermosetting plastic or a similar material. The use of thermosetting plastic or other suitable cementitious material provides firm but somewhat yieldable connection of the support members to the shaft. It is pointed out that a mechanical coupling such as clamping screws may be used to secure the coupling member to the shaft. However, a plastic coupling is preferred since mechanical couplings are rigid. In the event that two groups of discs 41 are used, a pair of end support members and an intermediate support member will be mounted on the shaft 18. Thereafter, the outer support rods and inner support rods will be extended through the bearing elements 59 of a plurality of disc sections and secured to an end support member and an intermediate support member. The disc sections that make up each disc will be urged into contacting relation so that each spacer element 53 engages the flat surface of one of the spacer engaging elements 56. When the discs are assembled in this fashion, each adjacent disc defines a plurality of arcuate V-shaped concentric passages 49 which are, in fact, defined by adjacent V-shaped arcuate channels 49. These concentric V-shaped passages are interconnected throughout their circumferential extent by transverse channels so that the disc assembly is not only provided with concentric flowthrough passages but adjacent passages are interconnected in communicating relation throughout their circumferential extent. This arrangement provides for excellent circulation. Further, the concentric arrangement of the V-shaped passages in the direction of rotation of the disc minimizes resistance to rotation and thereby lowers the power consumption needed to rotate the assembly.

The V-shaped cross-sectional configuration of the passages 49 clearly increases the effective surface area upon which the biological organisms may grow. It will be appreciated that the disc assembly when mounted in the tank 11 will have approximately thirty five to forty percent of the surface area disposed below the surface of the water. The disc will be rotated at a rate to permit effective digestion of the nutrient material in the water in the organisms.

In the event that it is desirable to remove and replace a disc section from a disc, it is only necessary to remove the nuts or bolts which secure the outer support rods 63 to the associated circular support members. The use of disc sections permits removal of separate disc sections rather than removal of the entire disc when a section becomes damaged or ineffective. It is also pointed out that by varying the size of the spacer elements for the disc sections, the spacing between adjacent discs may be varied. Thus, if the axial dimension of each spacer element is increased, adjacent discs will be spaced further apart than if the spacer elements were smaller. Therefore by varying the size (axial dimension) of the spacer elements, the number of discs used for the disc assembly may be readily varied. Thus by using the present design, none of the functional design conditions are altered even though discs may be manufactured to meet varying capacity requirements.

The location of the support rods not only provides maximum strength and even load distribution on the disc sections, but this arrangement also eliminates paddle action which occurs when support elements are located on the edge of the disc. A paddle action naturally increases the power consumption needed to rotate the disc.

From the foregoing description, it will be seen that we have provided a novel disc assembly for a water treatment system which is not only of relatively simple and economical construction, but one which functions in a more efficient manner than any heretofore known comparable system.

It is anticipated that the various changes can be made in the size, shape and construction of the water treatment apparatus disclosed herein without departing from the spirit and scope of our invention as defined by the following claims.

What is claimed is:

1. Apparatus for treating waste water contained within a tank, comprising:
   a revolvable, biological treatment assembly including an elongate shaft extending between opposite wall portions of the tank, means on the tank revolvably mounting the end portions of said shaft,
   a plurality of similar nonmetallic discs positioned along said shaft and each disc having inner and outer edges, means interconnecting said discs with said shaft for rotation therewith,
   a pair of generally circular rigid end support members each being positioned adjacent one of the endmost discs, a circular rigid intermediate support member disposed between a pair of said discs, means to said support members, each of said disc including a plurality of similar disc sections each having an inner arcuate edge, an outer arcuate edge, and substantially straight side edges converging from the outer arcuate edge thereof, each disc section having a surface configuration defining a plurality of radially spaced apart arcuate ribs projecting axially from one surface of the disc section and extending from adjacent one side edge thereof to adjacent the other side edge thereof, a plurality of arcuate channels located between adjacent arcuate ribs and projecting axially from the other surface of each disc section and extending from adjacent one side edge thereof to adjacent the other side edge thereof, transverse channels in each rib interconnecting adjacent arcuate channels of each disc section, said ribs and channels of each disc being concentrically arranged from adjacent the inner edge thereof to adjacent the outer edge thereof, each rib having a cross-sectional configuration substantially defining an acute angle having an arcuate apex, each arcuate channel having a cross-sectional substantially defining a curve whereby each rib and each channel of one disc projects into and is spaced from a rib and channel on the next adjacent disc to define concentric passage between adjacent discs, and means for rotating said shaft.

2. The apparatus as defined in claim 1 wherein the configuration of each disc section defines a plurality of spaced apart generally radially extending channels throughout the surface area thereof, a plurality of said radial channels intercommunicating adjacent arcuate channels of a disc section, whereby said concentric passages of said discs are intercommunicating at various points throughout the respective circumferences thereof with each adjacent concentric passage.

3. The apparatus as defined in claim 1 wherein each rib is provided with a plurality of spacer elements projecting axially therefrom, each transverse channel including a planar surface having a spacer engagement element projecting axially therefrom, each spacer element of one disc engaging a spacer engaging element of the next adjacent disc to axially space the ribs and channels of adjacent discs.

4. The apparatus as defined in claim 1 wherein said support members are formed of a nonmetallic material.

5. The apparatus as defined in claim 1 wherein each of said disc sections is provided with a plurality of generally cylindrical bearing elements integral therewith and projection axially therefrom, a plurality of elongate rigid rods each projecting through one of said bearings, and support means on said shaft engaging said rods.

6. Apparatus for treating waste water contained within a tank, comprising:

a revolvable, biological treatment assembly including an elongate shaft extending between opposite wall portions of the tank, means on the tank revolvably mounting the end portions of said shaft, a plurality of generally circular, rigid, axially spaced apart support members, each including a central hub having an opening therein through which the shaft projects, yieldable means between the hub of each support member and said shaft defining a yieldable coupling therebetween whereby said support members rotate the said shaft, a plurality of nonmetallic discs positioned along said shaft and each disc engaging the next adjacent disc, each disc having a surface configuration defining a plurality of concentric passages between adjacent contacting discs, at least a portion of each disc being adapted to extend below the surface of the waste water contained in the tank, a plurality of elongate substantially rigid rods extending through said discs, yieldable elements connecting opposite ends of each of said rods to a pair of said support members to thereby interconnect said disc with the shaft for rotation therewith, said yieldable elements being extensible in a longitudinal direction thereby permitting deflection of the rods during rotation of the shaft in response to deflection of the shaft, and means for rotating said shaft.

7. The apparatus as defined in claim 6 wherein said rigid rods include a plurality of axially extending, elongate, similar outer and inner rods each projecting through a plurality of said discs, said outer rods extending through said discs adjacent the peripheral edge portions thereof and said inner rods being disposed parallel to said outer rods and spaced radially inwardly therefrom.

8. The apparatus as defined in claim 7 wherein said support members are formed of a nonmetallic material and each has a plurality of spaced apart elongate grooves, therein, each groove of each support member extending from the periphery thereof radially inwardly, each end of each inner support rod being positioned in one of said grooves in a support member.

9. The apparatus as defined in claim 7 wherein each of said support members is comprised of a pair of similar nonmetallic discs secured together.

10. The apparatus as defined in claim 6 wherein said shaft is of hollow construction, a pair of trunnions each secured to one end of said shaft and projecting axially therefrom, each trunnion including an elongate shaft element having a diaphragm plate secured thereto intermediate the ends thereof and extending outwardly therefrom, said plate of each trunnion being rigidly affixed to the inner surface of said shaft, the shaft element of each trunnion including flared portions integral and on both sides of the associated diaphragm plate, and each trunnion having an inner plate secured to the inner end of the shaft element.

11. The apparatus as defined in claim 10 wherein said shaft is of octagonal cross-sectional configuration.

* * * * *